(12) United States Patent
Lin et al.

(10) Patent No.: US 11,631,890 B2
(45) Date of Patent: Apr. 18, 2023

(54) ALL SOLID-STATE LITHIUM-ION BATTERY PRODUCED BY PRESSURE-AIDED CO-CURING

(71) Applicant: Solid Energies Inc., Santa Ana, CA (US)

(72) Inventors: Zhigang Lin, Santa Ana, CA (US); Tianyu Meng, Santa Ana, CA (US)

(73) Assignee: Solid Energies Inc., Santa Ana, CA (US)

( * ) Notice: Subject to any disclaimer, the term of this patent is extended or adjusted under 35 U.S.C. 154(b) by 153 days.

(21) Appl. No.: 17/313,992

(22) Filed: May 6, 2021

(65) Prior Publication Data

US 2022/0359906 A1 Nov. 10, 2022

(51) Int. Cl.
*H01M 10/0562* (2010.01)
*H01M 10/0565* (2010.01)
*H01M 4/04* (2006.01)
*H01M 10/0525* (2010.01)

(52) U.S. Cl.
CPC ....... *H01M 10/0562* (2013.01); *H01M 4/043* (2013.01); *H01M 10/0525* (2013.01); *H01M 10/0565* (2013.01); H01M 2300/0071 (2013.01); H01M 2300/0082 (2013.01); H01M 2300/0091 (2013.01)

(58) Field of Classification Search
CPC ............. H01M 4/043; H01M 10/0562; H01M 10/0565; H01M 10/0525
USPC ........................................................ 429/306
See application file for complete search history.

(56) References Cited

U.S. PATENT DOCUMENTS

| | | | |
|---|---|---|---|
| 5,319,517 A | 6/1994 | Nomura |
| 5,670,272 A | 9/1997 | Cheu |
| 5,834,136 A | 11/1998 | Gao |
| 5,916,515 A | 6/1999 | Bryan |
| 6,040,085 A | 3/2000 | Cheu |
| 6,072,688 A | 6/2000 | Hennings |
| 6,328,770 B1 | 12/2001 | Gozdz |
| 6,391,069 B1 | 5/2002 | Gozdz |

(Continued)

*Primary Examiner* — James M Erwin
(74) *Attorney, Agent, or Firm* — Charles H Jew

(57) ABSTRACT

In solid-state lithium-ion battery cells, electrolyte-infiltrated composite electrode includes an electrolyte component consisting of polymer matrix with ceramic nanoparticles embedded in the matrix to form networking structure of electrolyte. The networking structure establishes effective lithium-ion transport pathway in the electrode. Electrolyte-infiltrated composite electrode sheets and solid electrolyte membranes can be used in all solid-state lithium electrochemical pouch and coin cells. Solid-state lithium-ion battery is fabricated by: (a) providing an anode layer; (b) providing a cathode layer; (c) positioning a ceramic-polymer composite electrolyte membrane between the anode layer and the cathode layer to form a laminar battery assembly; (d) applying pressure to the laminar battery assembly; and (e) heating the laminar battery assembly. Pressure-aided co-curing strengthens the contacts between the electrodes and the solid electrolyte membrane thus creating stable electrode-membrane interfaces with fewer porous regions. Lithium electrochemical cells and batteries exhibit excellent rate performance and outstanding stability over wide temperature range.

12 Claims, 9 Drawing Sheets

(56) References Cited

U.S. PATENT DOCUMENTS

| | | | |
|---|---|---|---|
| 6,562,513 B1 * | 5/2003 | Takeuchi | H01M 10/052 |
| | | | 429/189 |
| 7,118,817 B2 | 10/2006 | Bartholf | |
| 7,604,892 B2 | 10/2009 | Yoo | |
| 7,935,442 B2 | 5/2011 | Kim | |
| 10,297,874 B2 | 5/2019 | Omori | |
| 10,608,236 B2 | 3/2020 | Pozin | |
| 10,700,362 B2 | 6/2020 | Boolish | |
| 2005/0019638 A1 * | 1/2005 | Ravikiran | H01M 8/1039 |
| | | | 528/391 |
| 2006/0216585 A1 | 9/2006 | Lee | |
| 2013/0337304 A1 | 12/2013 | Luski | |
| 2020/0067126 A1 | 2/2020 | Han | |
| 2020/0335814 A1 | 10/2020 | Lin | |
| 2020/0388798 A1 | 12/2020 | Wang | |
| 2022/0069277 A1 * | 3/2022 | Lee | H01M 10/446 |

* cited by examiner

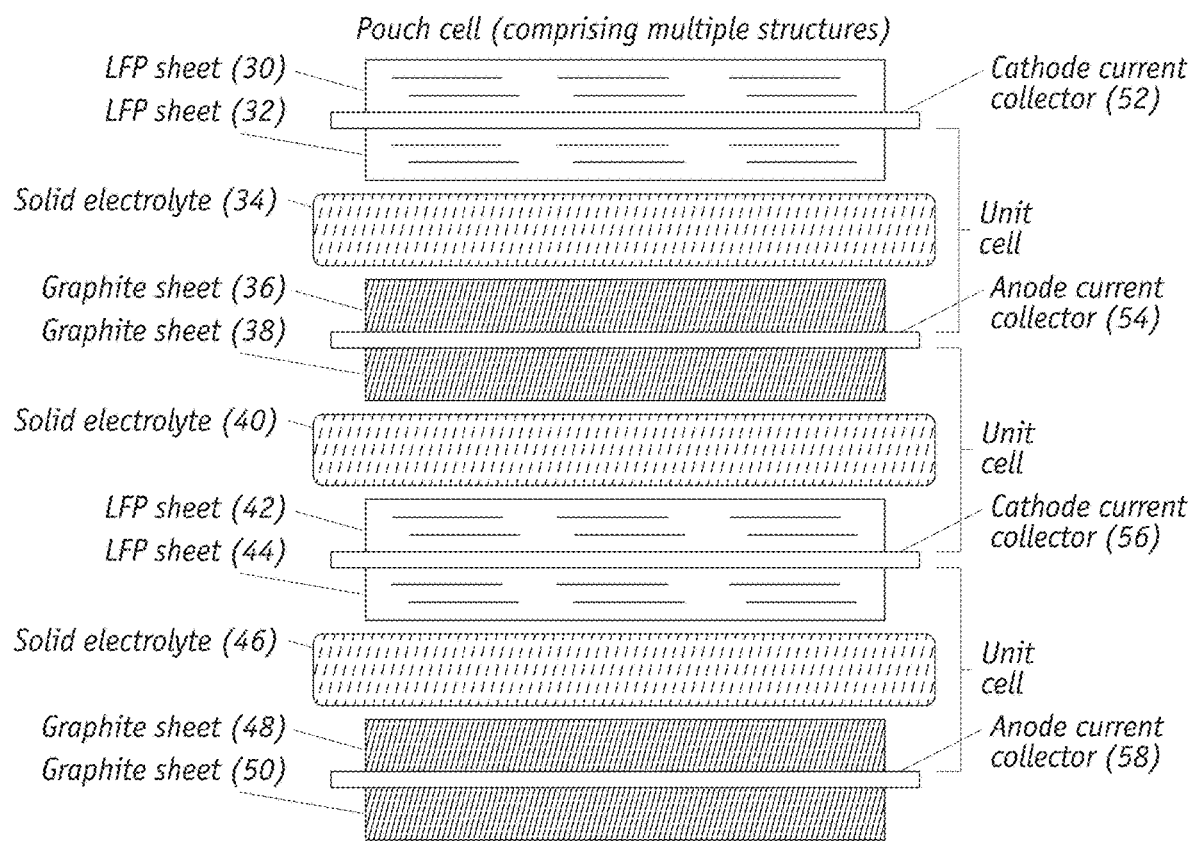
FIG. 5A
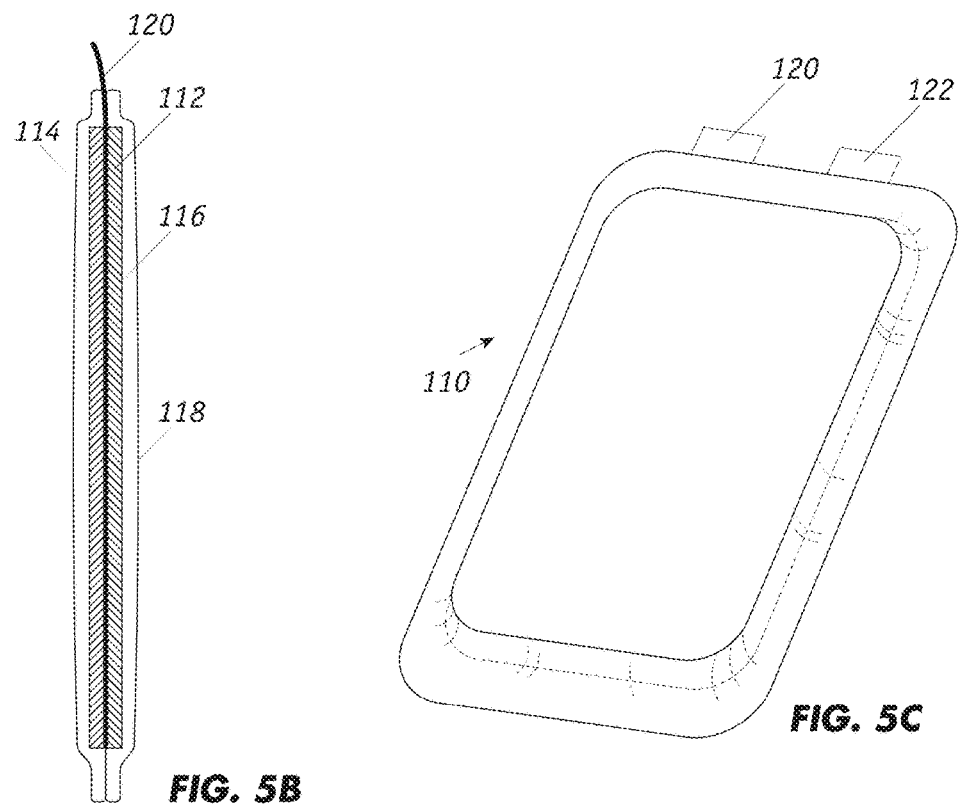
FIG. 5B
FIG. 5C

ALL SOLID-STATE LITHIUM-ION BATTERY PRODUCED BY PRESSURE-AIDED CO-CURING

FIELD OF THE INVENTION

The present invention generally relates to electrochemical devices and, more particularly, to solid-state lithium-ion battery cells based on electrolyte-infiltrated composite electrodes exhibiting a network of electrolyte which improves the cycling stability and lifetime of all solid-state lithium-ion electrochemical cells and batteries through establishing Li-ion transport pathways in the electrode. In the course of lithium-ion battery cell production, the use of pressure-aided co-curing strengthens the contacts between the electrodes and the solid electrolyte membrane thus creating stable electrode-membrane interfaces with fewer porous regions.

BACKGROUND OF THE INVENTION

Non-aqueous lithium electrochemical cells typically include an anode, a lithium electrolyte prepared from a lithium salt dissolved in organic solvents, and a cathode of an electrochemically active material. Organic solvents are added to solvate the lithium salts which provide mobile ions. During the electrochemical discharge process lithium ions are transported through the electrolyte from the anode to the cathode. As lithium ions are taken up by the cathode, there is a simultaneous release of electrical energy.

Solid-state electrolytes (SSEs) can replace conventional organic liquid electrolytes, which are generally flammable and toxic, and thus eliminate the hazards associated with the liquid electrolte. Conventional electrode materials and lithium metal anodes can be employed with a SSE. Lithium anodes have high inherent high capacities (C) which increase the cell voltage (V) and thereby improves the energy density of the battery (E=VC). There are two critical challenges to achieving high performance batteries using SSE, which are (1) low ionic conductivities of many SSEs and (2) the low mechanical strengths of electrolyte materials that do not adequately prevent Li dendrite growth. SSEs which are being explored are typically inorganic-based (depending on the lattice structure, they are garnet, perovskite, glass-ceramics etc.) and polymer-based. Solid polymer electrolytes can be manufactured by relatively simple, inexpensive techniques whereas fabricating solid inorganic electrolytes with well-defined compositions or lattice structures requires high temperature processes. Due to the high degree of coordination between Li ions and the polymer chain in solid-state polymer electrolytes, the chain-assisted Li$^+$ transport mechanism is less robust at room temperature or below the melting temperature of the polymer. The attendant poor ionic conductivity is attributed to interference with Li ion transport. The addition of plasticizers to the solid-state polymer-based electrolyte improves the polymer chain mobility at room temperature which results in an increase in the ionic conductivity but the plasticizers also reduce the mechanical strength of the solid-state polymer-based electrolyte.

So-called all-solid-state batteries contain exclusively solid materials, and in particular solid-state electrolytes, in contrast to conventional batteries containing liquid electrolytes. One of the main concerns of current all solid-state lithium-ion batteries (ASSLiBs) is the poor contact between solid electrolyte and electrodes. The high contact resistance causes low rate capability and poor cycling stability. With solid polymer electrolytes, lithium dendrites, which develop as an electrochemical cell undergoes charging and discharging cycles, can penetrate through the 'plasticizer-softened' polymer electrolytes to short circuit the cell.

SUMMARY OF THE INVENTION

The present invention is based, in part, on the development of an electrolyte (ceramic-polymer nanocomposite)—infiltrated composite electrode that has a 3-dimensional polymer matrix with ceramic nanoparticles distributed or embedded in the matrix. The ceramic-polymer-containing composite electrode includes: (i) a polymer matrix, (ii) ceramic nanoparticles that are distributed in the polymer matrix, (iii) a lithium salt, (iv) a plasticizer, (v) an anode active material or cathode active material that is distributed in the polymer matrix, (vi) a conducting agent that is distributed in the polymer matrix, (vii) additional binder (optional), for instance, if the weight ratio of active material is high.

For ASSLiBs, the ceramic-polymer-infiltrated composite electrolyte membrane includes: (i) a polymer matrix, (ii) ceramic nanoparticles with diameters that range from 10 to 2000 nm that are distributed in the polymer matrix, (iii) a plasticizer (iv) a lithium salt, wherein the ceramic nanoparticles are selected from the group consisting of ceramic materials having the basic formula $Li_7La_3Zr_2O_{12}$ (LLZO) and its dopant derivatives, such as $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Incorporating ceramic nanoparticles to enhance the mechanical strengths of polymer electrolytes can suppress Li dendrite growth, which significantly improves the cycling stability of batteries based on ceramic-polymer composite solid electrolytes. Moreover, nano-sized ceramic particles have excellent miscibility with the polymer materials and the particles afford ionic transport channels which facilitate ion transport within the ceramic-polymer solid electrolyte layer. The ceramic-polymer composite electrolyte exhibits high ionic conductivity over a wide temperature window.

In this electrochemical cell, the cathode's polymeric networking structure of electrolyte serves as ionic conductive pathways for electrons and Li$^+$ transport for active material particles during the lithiated/delithiated process. This continuous Li$^+$ conductive network in the cathode composite produces a cathode with higher energy/power performance. The crosslinking structure of the polymeric network or polymer matrix strongly binds all of the cathode components. The composite anode and composite cathode form good physical interfacial contacts with the composite electrolyte membrane for improved rate performance and cycling stability.

In one aspect, the invention is directed to a method of fabricating a solid-state lithium-ion battery that includes: (a) providing an anode layer; (b) providing a cathode layer; (c) positioning a ceramic-polymer composite electrolyte membrane between the anode layer and the cathode layer to form a laminar battery assembly; (d) applying pressure to the laminar battery assembly; and (e) heating the laminar battery assembly.

In another aspect, the invention is directed to a method of fabricating a pouch cell that includes: (a) providing a flexible shell in the form of a pouch; (b) placing one or more unit cells in the pouch, wherein each unit cell comprises (i) an anode layer (ii) cathode layer and (iii) a ceramic-polymer composite electrolyte membrane between the anode layer and the cathode layer; (c) applying pressure to the pouch; and (d) heating the pouch.

In yet another aspect, the invention is directed to a method of fabricating a coin cell that includes: (a) providing a first metal pole having a first planar exterior surface; (b) providing a second metal pole having a second planar exterior surface; (c) positioning a unit cell between the first and second metal poles wherein the unit cell comprises (i) an anode layer (ii) cathode layer and (iii) a ceramic-polymer composite electrolyte membrane between the anode layer and the cathode layer; (d) applying pressure to compress the first and second metal poles, wherein the first and second poles are electronically separated by an insulating material; and (e) heating the first and second metal poles.

The pressure and heat treatment melt the solid electrolyte to flow thereby eliminating pores in the surfaces of solid electrolyte and electrode and within the electrodes as the polymers cure. The technique (1) strengthens the contact between electrode and solid electrolyte, (2) creates electrochemically stable solid electrolyte interphases and (3) forms a dense microstructure in the battery cell. Lithium electrochemical cells and batteries processed by the pressured-aided co-curing will have excellent rate performance as well as outstanding stability over a wide temperature range.

BRIEF DESCRIPTION OF THE DRAWINGS

FIG. 5A depicts a multiple unit cell structure for a pouch cell.

FIGS. 5B and 5C are side and perspective views of an assembled pouch cell.

DETAILED DESCRIPTION OF PREFERRED EMBODIMENTS

Figure 1A:
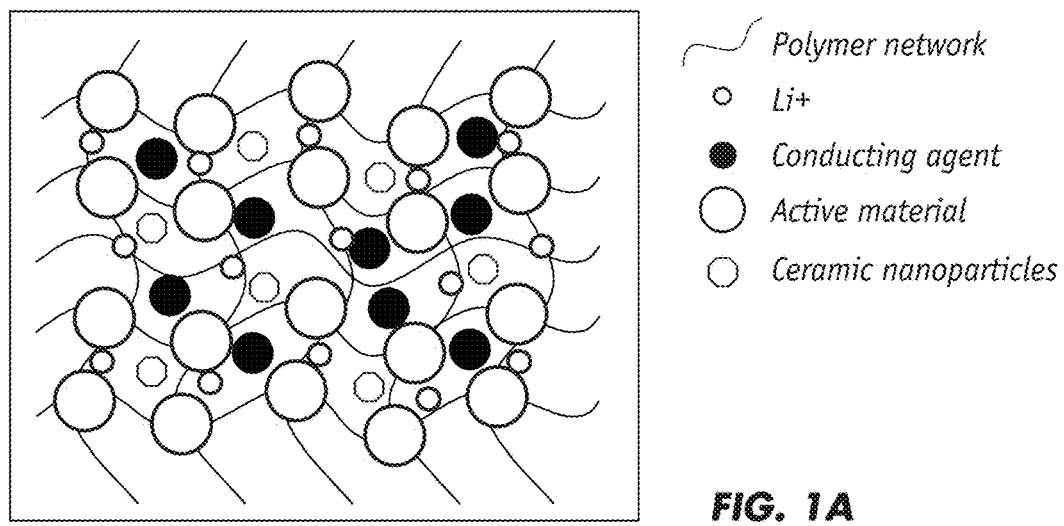
FIG. 1A depicts the networking structure of the electrolyte and resultant electrolyte-infiltrated composite electrode.

This invention is directed to solid-state lithium-ion batteries based on ceramic-polymer electrolyte infiltrated composite electrodes (cathodes and anodes) that are particularly suited for used in lithium-ion electrochemical cells and batteries. The electrode has a polymer-based electrolyte forming a 3 dimensional-like networking structure in which (1) active materials (cathode or anode), (2) conducting agent, and (3) lithium salt and (4) ceramic nanoparticles are homogeneously distributed throughout the network. The electrode can include a plasticizer and a binder, if required.

The active materials for anodes include any compatible anodic material which functions as an anode in solid lithium-ion electrochemical cells. Preferred anode active materials are graphite based and silicon-based materials.

The active materials for cathodes include any compatible cathodic material which functions as a positive pole in a solid lithium electrochemical cell. Preferred cathode active materials which are compatible with the polymer-based electrolyte comprise, for example, sulfur (S), $LiNi_{0.5}Mn_{1.5}O_4$ (LNMO), $LiFePO_4$ (LFP), $LiNi_{0.8}Co_{0.1}Mn_{0.1}O_2$ (NCM811), $LiNi_{0.5}Co_{0.2}Mn_{0.3}O_2$ (NCM 523) and $LiNi_{0.6}Co_{0.2}Mn_{0.2}O_2$ (NCM 622) and mixtures thereof.

The conducting agent is an electronically conductive material that is preferably made of carbon, in particular elemental carbon. The electronically conducting agent can be, for example, carbon black.

The lithium salt is any lithium salt suitable for solid lithium electrochemical cells. These include, for example, bis(trifluoromethane)sulfonimide lithium salt (LiTFSI), lithium hexafluorophosphate ($LiPF_6$), lithium hexafluoroarsenate ($LiAsF_6$), $LiClO_4$, lithium bis(oxalato)borate (LiBoB), and mixtures thereof.

The polymer matrix component of the electrolyte is formed from a mixture of monomers, oligomers or partial polymers thereof (collectively referred to as polymer precursors). Preferred polymer matrices comprise poly(ethylene oxide) (PEO), poly(ethylene glycol diacrylate) (PEGDA), poly(acrylonitrile (PAN), polysiloxane, poly(vinylidene fluoride-co-hexafluoropropylene) [P(VDF-HFP)], poly(methyl methacrylate) (PMMA), and mixtures thereof.

The ceramic nanoparticles comprise lithium metal oxides with diameters that range from 10 nm to 2000 nm. Preferred ceramic nanoparticles include $Li_7La_3Zr_2O_{12}$ (LLZO) and derivatives thereof wherein specific quantities of Al, Ta and/or Nb are substituted at the Zr sites. Derivatives include, for example, $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Particularly preferred ceramic nanoparticles are $Al_xLi_{7-x}La_3Zr_{1.75}Ta_{0.25}O_{12}$ (x ranges from 0.01 to 0.85) and $Li_7La_3Zr_{2-z}Nb_zO_{12}$ (z ranges from 0.01 to 0.60) which exhibit improved the ionic transport in the electrodes.

LLZO and derivatives thereof are commercially available, such as from Millipore Sigma (St. Louis, Mo.) and MSE Supplies (Tucson, Ariz.). Derivatives of LLZO can be manufactured by standard solid-state techniques using different proportions of $Al_2O_3$, $Ta_2O_5$, and/or $Nb_2O_5$. For example, $Al_xLi_{7-x}La_3Zr_{1.75}Ta_{0.25}O_{12}$ wherein x ranges from 0 to 0.85 is synthesized by mixing stoichiometric amounts of starting powders including $LiOH \cdot H_2O$, $La_2O_3$, $ZrO_2$, $Al_2O_3$ and $Ta_2O_5$ and milling the mixture via high energy ball milling in ethanol media for 8-12 hrs. Zirconia balls (average diameter of 5 mm) balls at a ball-to-powder weight ratio of about 20:1 and about 360 rpm milling speed. After milling, the collected slurry is dried (80° C., 2-3 hrs.), crushed, and sieved (through a 200 mesh), and calcined at about 900° C. for 6 hours to fully decompose LiOH. The as-calcined powders are then ball-milled again in ethanol for 6-12 hrs. Planetary ball mill was used, followed by drying process. The dried powders were pressed into pellets with diameters of about 9.5 mm at about 300 MPa, and then sintered with a temperature range from 800° C. to 1150° C. for about 4 hrs. to obtain particles with size from 100 nm to 2000 nm. Both calcination and sintering processes are carried out with samples in alumina crucibles covered by alumina lids, and the pellets are embedded in corresponding mother powder in order to mitigate losses of volatile components and accidental contamination.

The plasticizer is a compound that is preferably solid at room temperature (20° C.) and serves as a liquid medium in which the polymer precursors can polymerize to form a polymer matrix. Preferred plasticizers are organic compounds such as succinonitrile (SCN), sulfolane (SL), ethylene carbonate (EC), dimethyl sulfoxide (DMSO), glutaronitrile (GN), propylene carbonate (PC), and mixtures thereof.

Binders such as polyvinylidene fluoride (PVDF) and polyacrylic acid (PAA) can be used as necessary. PVDF is used if the weight ratio of active material is high. In the case of anodes, binders can be used if the active material is about 80 wt % or more and in the case of cathodes binders can be used if the active material is about 80 wt % or more.

Composite anodes typically include 60 to 96 wt % anode material, 1 to 15 wt % conducting agent, 0.1 to 10 wt % lithium salt, 0.1 to 5 wt % ceramic nanoparticles, 0.1 to 10 wt % plasticizer, 0.1 to 5 wt % polymer matrix and 0 to 15 wt %, binder.

Composite cathodes typically include 60 to 96 wt % cathode material, 1 to 15 wt % conducting agent, 0.1 to 10 wt % lithium salt, 0.1 to 5 wt % ceramic nanoparticles, 0.1 to 10 wt % plasticizer, 0.1 to 5 wt % polymer matrix and 0 to 15 wt %, binder.

The composite electrode as depicted in FIG. 1A has a polymer network or matrix with cathode or anode active materials, conducting agents, lithium ions and ceramic nanoparticles that distributed or infiltrated within the matrix. The composite electrode with its 3-D polymer network structure exhibits (i) enhanced ion-transport and (ii) improved contact with solid electrolytes. Lithium-ion batteries incorporating these composite electrodes will have high energy densities, excellent rate performances and long cycle lifetimes.

Figure 1B:
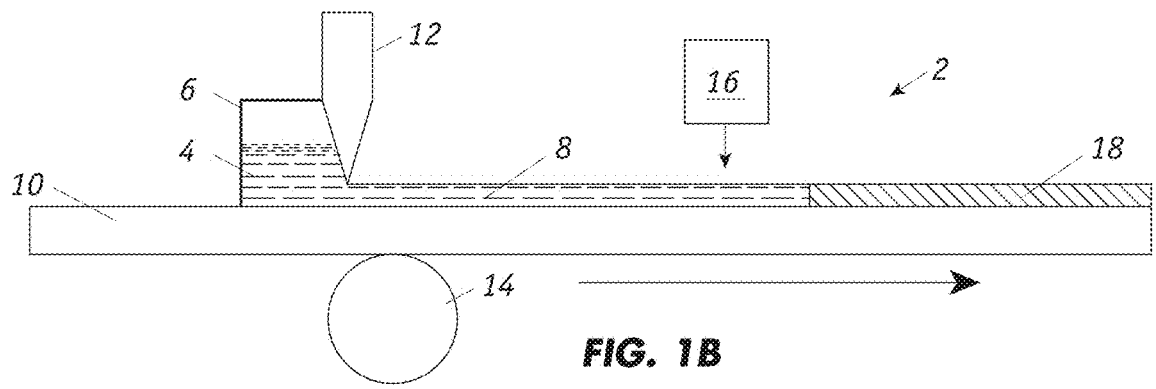
FIG. 1B is an apparatus for producing electrolyte-infiltrated composite cathodes and anodes.
Figure 1C:
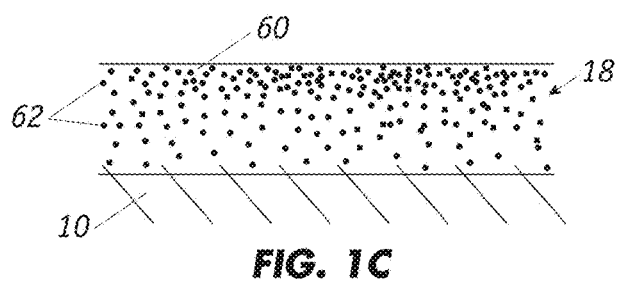
FIG. 1C depicts a gradient of nanoparticles within the electrolyte-infiltrated composite.

FIG. 1B shows a tape-casting system 2 for preparing the composite electrode. The anode or cathode active materials, conducting agent and binder are preferably dried under vacuum before being added into tank 6. A mixture of polymer precursor and plasticizer is added to tank 6 to form a precursor slurry, which also contains 0.001 wt % to 1.0 wt % of a photoinitiator such as phenyl bis(2,4,6-trimethylbenzoyl)phosphine oxide (819). An adjustable doctor blade 12 coats a wet film 8 of the precursor slurry of the desired thickness onto the current collector foil 10 which is supported by stationary roll 14. UV radiation directed to wet film 8 from UV source 16 initiates in-situ radical polymerization to crosslink the polymer precursor in the electrode composite 18. The monomer or polymer precursors polymerize and/or crosslinked, which establishes polymer network that has strong interactions with the other components in the electrode. Therefore, the polymer matrix can act as binder and completely or partial replace the traditional binder such as PVDF. It has been found that ceramic nanoparticles accumulate toward the top of the composite electrode 18 so that a ceramic nanoparticle gradient is established within layer 18 along the direction of the thickness. As shown in FIG. 1C, a cathode substrate 10 is laminated with a layer of composite electrode wherein polymer matrix 60 is formed on substrate 10 and the nanoparticles 62 are not homogeneously distributed. The upper side of the composite electrode on which the anode is disposed has a higher concentration of ceramic nanoparticles which acts as a barrier to lithium dendrite growth. To fabricate electrodes with the ceramic nanoparticles homogeneously distributed therein, the polymer precursors should be cured rapidly or adjusted to have a higher viscosity in order to prevent potential migration of the nanoparticles in the course of processing.

As an example, to prefabricate an electrolyte-infiltrated composite anode by tape-casting method without using a binder, a precursor slurry comprising 1 wt % to 10 wt % carbon black, 60 wt % to 96 wt % graphite and 1 wt % to 20 wt % polymer precursor are mixed at 50° C. to 70° C. for at least 12 hours in N-Methyl-2-pyrrolidone (NMP) solvent. Typical solvent-to-solid ratio is 1 ml to 0.5 g~1.0 g solid. The slurry is printed on an anode current collector, typically copper foil, by tape-casting method and the printed sheets are under UV light for 10 minutes. Finally, the sheets are dried, calendared and cut.

As an example, to fabricate an electrolyte-infiltrated composite cathode by a tape-casting method without using a binder, 1 wt % to 10 wt % carbon black, 60 wt % to 96 wt % LFP and 1 wt % to 20 wt % polymer precursors are mixed in N-Methyl-2-pyrrolidone (NMP) solvent. Typical solvent-to-solid ratio is 1 ml to 0.6 g~1.2 g solid. The slurry is printed on cathode current collector, typically aluminum foil, by tape-casting method and the printed sheets are under UV light for 10 minutes. Finally, the sheets are dried, calendared and cut.

The ceramic-polymer nanocomposite exhibits outstanding ionic conductivities of over $1\times10^{-3}$ S/cm from a temperature range of $-30°$ C. to $10°$ C. and that is higher than $1\times10^{-3}$ S/cm when measured at a temperature of $20°$ C. or higher and wide electrochemical window of up to 5.8V at room temperature. Moreover, it is thermally stable below 150° C. and low glass transition temperature of $-60°$ C. Finally, this electrolyte shows low interfacial resistance, good compatibility with both lithium metal as anode material, other anode materials and cathode materials, with enhanced mechanical strength with a Young's modulus that exceeds 50 MPa.

Composite anodes and composite cathodes can be used in solid-state lithium ion electrochemical cells and batteries with solid-state polymer electrolytes. A particularly preferred solid-state electrolyte is a ceramic-polymer composite electrolyte membrane that comprises: (i) a polymer matrix, (ii) ceramic nanoparticles with diameters that range from 10 to 2000 nm that are distributed in the polymer matrix, (iii) a plasticizer (iv) a lithium salt, wherein the ceramic nanoparticles are selected from the group consisting of ceramic materials such as having the basic formula $Li_7La_3Zr_2O_{12}$ (LLZO) and derivatives thereof wherein specific quantities of Al, Ta and/or Nb are substituted at the Zr sites. Derivatives include, for example, $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Particularly preferred ceramic nanoparticles are $Al_xLi_{7-x}La_3Zr_{1.75}Ta_{0.25}O_{12}$ (x ranges from 0.01 to 0.85) and $Li_7La_3Zr_{2-z}Nb_zO_{12}$ (z ranges from 0.01 to 0.60).

The polymer matrix, ceramic nanoparticles, plasticizer and lithium salt used for the electrolyte membrane can be the same as those used in preparing the inventive ceramic-polymer composite electrodes. The ceramic-polymer composite electrolyte membrane typically includes 20 to 60 wt % lithium salt, 5 to 60 wt % ceramic nanoparticles, 10 to 60 wt % plasticizer, and 10 to 50 wt % polymer matrix. The electrolyte membrane exhibits an ionic conductivity of higher than $1\times10^{-4}$ S/cm when measured at a temperature in the range of $-20°$ C. to $10°$ C. and higher than $1\times10^{-3}$ S/cm when measured at a temperature $20°$ C. or higher.

Figure 2:
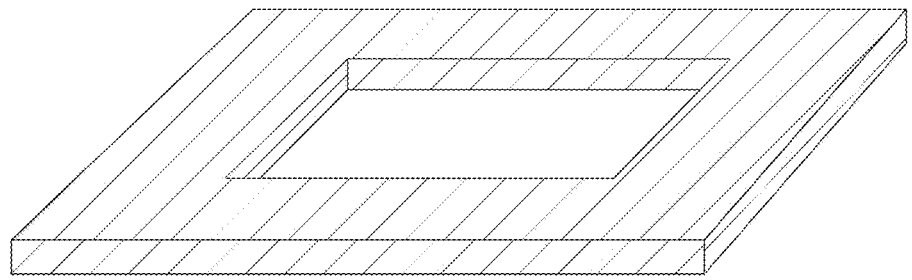
FIG. 2 is a specific designed module for in-situ polymerization of a solid-state electrolyte.

FIG. 2 illustrates a mold structure for making the solid-state electrolyte. A precursor solution consisting of polymer precursor, ceramic nanoparticles, plasticizer, lithium salt and binder is mixed and poured onto the specifically designed module which has a precisely controlled geometry. The module serves as a mold and is made from a sheet of plastic wherein the aperture or opening with specific dimensions formed. A typical module has a rectangular aperture having (L×W×H) dimensions of 6.2 cm×4.6 cm×0.2 mm, respectively, which is specifically designed for special prototype. In-situ polymerization yields a free-standing solid-state electrolyte that can be peeled off the module. A large size solid-state electrolyte is assembled with comparable size cathode and anode sheets, to fabricate all solid-state lithium-ion pouch cells with targeted performance of 3.6V/2.0 Ah that can be further assembled into battery packs of with 28V/5 Ah or 28/25 Ah specifications. UV radiation is applied to the film for polymerization to produce a layer of solid-state electrolyte. For fabricating electrochemical coin cells or pouch cells, the wet film is typically 30 to 900 μm thick.

Lithium electrochemical cells and batteries employing the large size solid-state electrolyte will have excellent rate performance as well as outstanding cycling stability (>1000 cycles) over a wide range of temperatures. Batteries with the novel ceramic-polymer nanocomposite electrolyte will meet severe specifications for wide temperature working ranges, quick charging requirement, and high energy density.

An exemplary electrochemical cell includes a LFP cathode, a solid-state electrolyte, and a graphite anode, with a single layer or multi-layer structure. The anode and solid electrolyte define a first interface where graphite and solid electrolyte meet and form intimate contacts. Similarly, the cathode and solid electrolyte define a second interface where LFP and solid electrolyte meet and form intimate contacts. With the use of a networking-structure electrolyte in the electrodes, the intimate contacts afford good ion transport and reduce interfacial resistance.

Lithium electrochemical coin cells are manufactured by positioning an anode, electrolyte, cathode, spacers, and springs between two electrode shells and crimping the entire assembly. A high-pressure crimper typically applies a pressure of about 100 to 1200 psi.

Figure 3A:
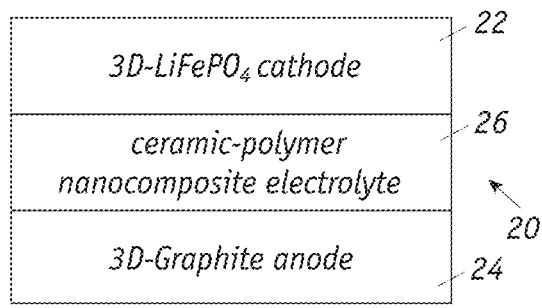
FIG. 3A is a cross sectional illustration of an electrochemical cell.

FIG. 3A depicts an electrochemical cell 20 that comprises an LFP cathode 22 and lithium metal anode 24 with a ceramic-polymer nanocomposite solid-state electrolyte 26 interposed in-between. The anode 24 and electrolyte 26 layers define a first interface where the lithium metal and electrolyte materials meet and form intimate contacts. Similarly, the cathode 22 and electrolyte 26 layers define a second interface where the LFP and electrolyte materials meet and form intimate contacts. The intimate contacts afford good ion transport and reduce interface resistance. Electrochemical cells can be stacked into batteries.

Figure 3B:
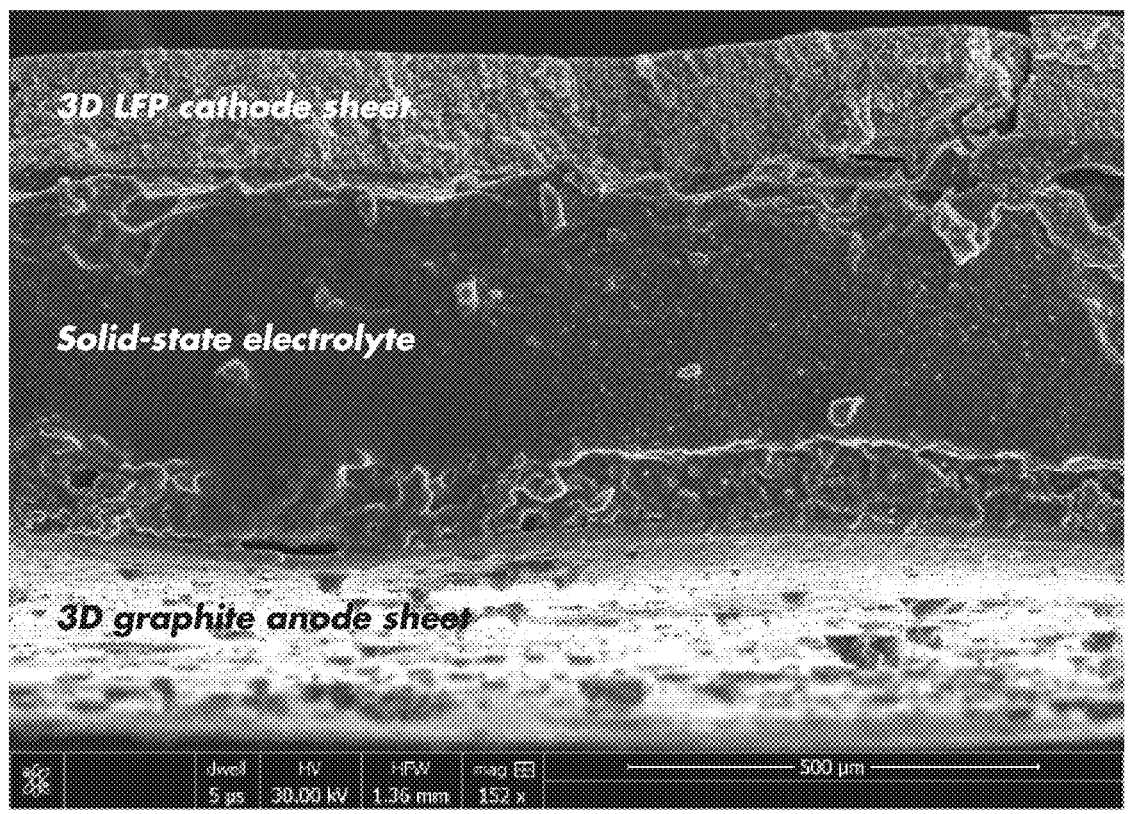
FIG. 3B is a cross-section scanning electrode microscopy (SEM) image of an electrochemical cell containing an electrolyte-infiltrated cathode, electrolyte-infiltrated anode and polymer (e.g., PEGDA)-ceramic (e.g., LLZO) SSE.

FIG. 3B shows the cross-sectional scanning electron image (SEM) of a cell core comprising a composite cathode sheet, solid electrolyte and anode sheet. The cathode sheet, solid electrolyte layer and anode sheet are clearly distinguishable. The optical response spectrum is determined by the solid electrolyte.

Figure 4A:
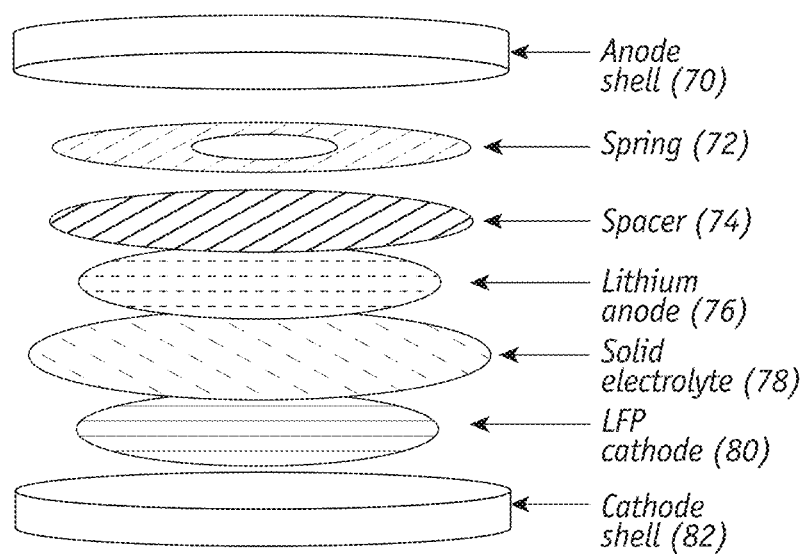
FIG. 4A is an exploded schematic view of a coin cell.
Figure 4B:
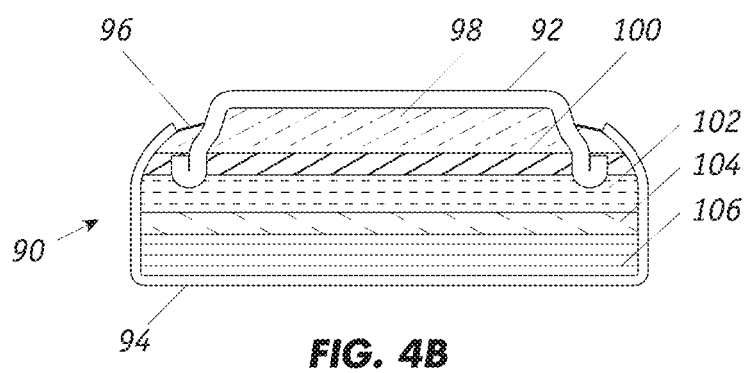
FIG. 4B is a cross sectional view of a coin cell.

An electrochemical cell can be encapsulated to form a coin cell. As shown in FIG. 4A, the internal components include spring 72, spacer plate 74, lithium anode 76, solid electrolyte 78, and LFP cathode 80. The anode shell 70 and cathode shell 82 serve as current collectors on the exterior surfaces of the cathode and anode. The shells preferably have planar external surfaces. As shown in FIG. 4B, an assembled lithium electrochemical coin cell 90 has spring 98, spacer 100, anode 102, solid electrolyte 104, and cathode 106 that are positioned between two electrode shells 92, 94. Crimping encases the entire structure with a plastic gasket 96 which electronically separates the shells. A high-pressure crimper typically applies a pressure of about 100 to 1200 psi.

Electrochemical cells can also be encapsulated to form a pouch cell type battery as shown in FIG. 5A which includes a plurality of unit cells. In this configuration, the pouch cell includes LFP cathode sheets 30 and 32 that are connected to cathode current collector 52, anode graphite sheets 36 and 38 that are connected to anode current collector 54, LFP cathode sheets 42 and 44 that are connected to cathode current collector 56, and anode graphite sheets 48 and 50 that are connected to anode current collector 58. Solid electrolytes 34, 40, and 46 are positioned between the anodes and cathodes as shown.

FIGS. 5B and 5C depict an assembled pouch cell 110 comprising a cathode layer 112, anode layer 114 and solid electrolyte 116 which are enclosed inside a flexible shell in the form of a pouch 118. Cathode layer 112 is attached to positive contact 120 and anode layer 114 is attached to negative contact 122. This illustrative pouch cell 110 has a single unit cell; pouch cell can comprise a plurality of from 5 to 50 connected unit cells that enclosed in a laminated aluminum case.

It has been demonstrated that incorporating a pressure and heat treatment in the fabricating process in making all solid-state electrochemical cells produces lithium-ion cells and batteries with improved properties. The simultaneous treatment causes polymers in the electrode to soften and interact with soften polymers the solid electrolyte thereby establishing intimate contact and improved stability at the interphase. The lithium-ion cells and batteries will exhibit high energy density, good rate performance and long cycle lifetime.

Figure 6A:
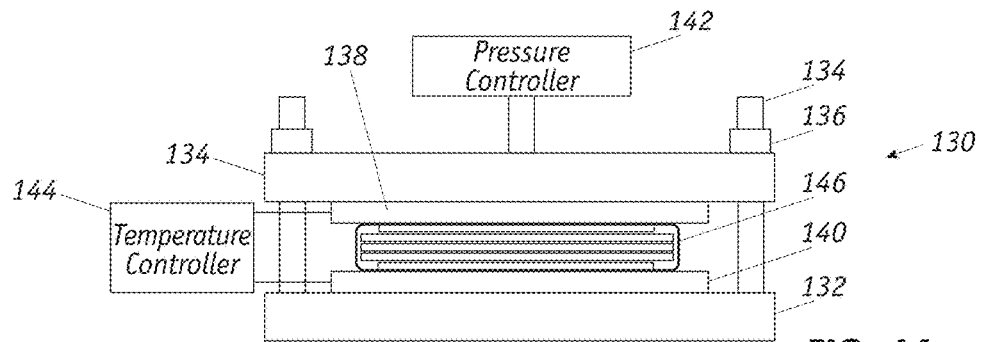
FIG. 6A illustrates a heated compression module for hot plate pressing (HPP).

A compression module for implementing the pressure and heat treatment is shown in FIG. 6A in the form of a hot plate press 130 that includes a stationary platform 132 which has a metal heating plate 138 and a movable platform 134 with metal heating plate 140. Temperature controller 144 powers and regulates resistive heating elements in the flat plates. The two platforms are secured and aligned by bolts 134. Pouch cell 146 is positioned between plates 138, 140 which are heated. The nuts 136 can be manually tightened, alternatively, a motorized power controller 142 can be employed to apply the desired pressure to the pouch cell. For pouch cells, during the treatment a typical pressure of 100 to 800 psi is applied and the temperature maintained at 80 to 280° C. for 1 to 100 min. A preferred temperature range for ASSLiBs pouch cells is from 120 to 180° C., which is high enough to make most polymeric composite electrolytes soften and melt. A preferred pressure used for pouch cells is from 200 psi to 500 psi which can be generated by a pneumatic machine or hydraulic machine.

Hot pressing the lithium-ion electrochemical pouch cell densifies the finalized cell. By reducing the thickness, the volume of the cell pack is decreased and the volume energy density is increased. Moreover, the hot-pressing force is applied along a uniform direction that perpendicular to the plane defined by the surface of the pouch so that the thickness of the pouch cell is homogeneous and the shape of cell is optimized. Hot pressing softens and melts the polymer-based solid electrolyte, so it become liquid-like during pressing process. In this fashion, the electrolyte fills existing pores on the electrode sheet which in turn further strengthens the contact between solid electrolyte and electrode.

Figure 6B:
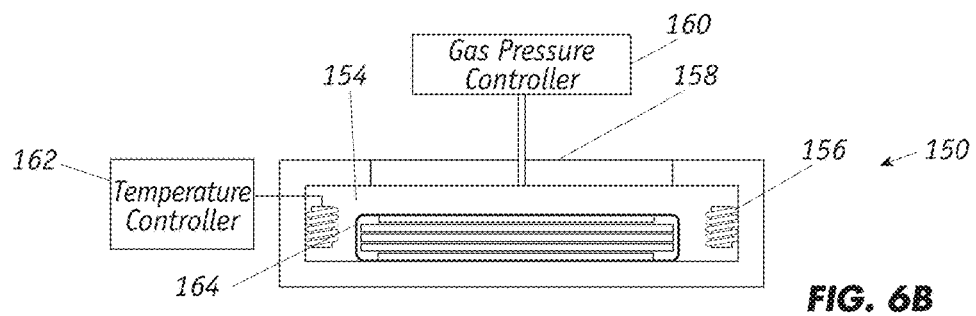
FIG. 6B illustrates a warmed isostatic press (WIP) apparatus.

FIG. 6B illustrates a warm isostatic pressing (WIP) apparatus 150 that includes tank 152 which defines a liquid-filled chamber 154 into which a pouch cell 160, which sealed in a vacuum waterproof bag, is placed. The tank has a removable cover 158. Temperature controller 162 regulates resistive heating coils 156. High pressure inert gas such as argon is pumped into the liquid 158 by gas pressure controller 160. Water is used as the liquid medium. WIP is particularly suited for pouch cells. During WIP treatment a typical pressure of 100 to 80,000 psi is applied and the temperature maintained at 60 to 120° C. for 1 to 100 min. A preferred temperature range for ASSLiBs pouch cell is from 80 to 110° C. A preferred pressure to the pouch cell is from 10,000 psi to 30,000 psi.

The inventive pressure and heat treatment technique can be used in making coin cells. After a coin cell is crimped to produce a coin cell as shown in FIG. 3A, the coin cell then placed in the flat press apparatus shown in FIG. 6A. During the treatment a typical pressure of 100 to 1200 psi is applied and the temperature maintained at 80 to 280° C. for 1 to 100 min. A preferred temperature range for ASSLiBs coin cells is from 120 to 180° C. A preferred pressure to the coin cell is from 600 psi to 1100 psi The flat press apparatus shown in FIG. 6A can also be used in making pouch cells. For pouch cells, during the treatment a typical pressure of 100 to 800 psi is applied and the temperature maintained at 80 to 280° C. for 1 to 100 min. A preferred temperature range for ASSLiBs pouch cell is from 120 to 180° C., which is high enough to make most polymeric composite electrolytes soften and melt. A preferred pressure to the pouch cell is from 200 psi to 500 psi which can be generated by a pneumatic machine or hydraulic machine.

Figure 7:
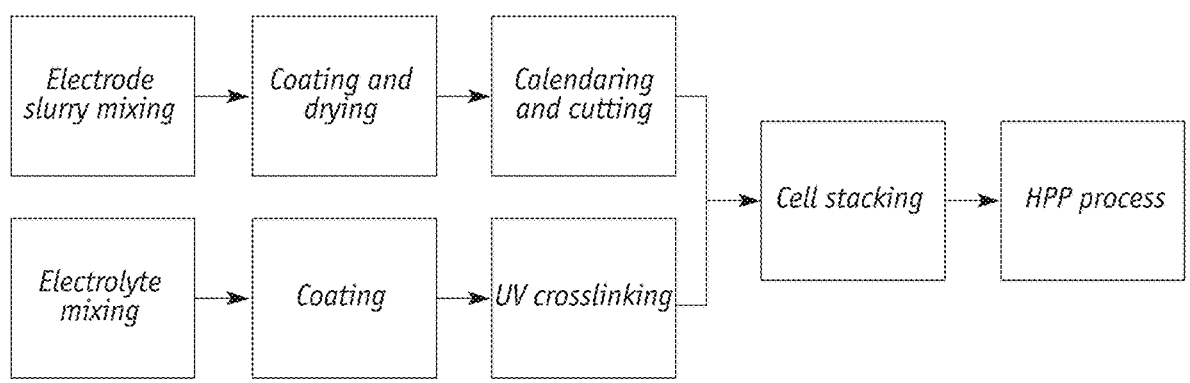
FIG. 7 shows a procedure for making electrochemical coin cells which incorporates the HPP.

A method of making coin cells is presented in FIG. 7. To prepare the LFP cathode, a slurry is prepared by mixing each component in NMP solvents and stirring overnight. Then, the slurry is casted on an Al foil, followed by UV crosslinking for 10 minutes, convection dried at 80° C. for 2 hours and vacuum dried at 150° C. overnight. Thereafter, the LFP cathode sheets are calendared and cut into circular pieces. To prepare a free-standing solid electrolyte, a precursor solution is prepared by mixing every component and stirring for 1 hour. Then, the precursor solution is onto a PTFE substrate, followed by UV crosslinking for 10 minutes. A coin cell is stacked with the following structures: cathode case, LFP cathode sheet, solid electrolyte, lithium metal anode sheet or graphite anode sheet, a spacer, a spring and anode case. The coin cell is hot pressed with a coin cell crimping machine. Typically, the two dies are heating to 100° C. and the temperature is maintained for 20 minutes for stability. Then, coin cell is placed between two dies and stands for 20 minutes to ensure the entire structure is preheated to 100° C. Finally, a pressure of about 1000 psi is applied and is maintained for 3 minutes. The entire procedure is conducted in an Ar-filled glovebox.

Figure 8:
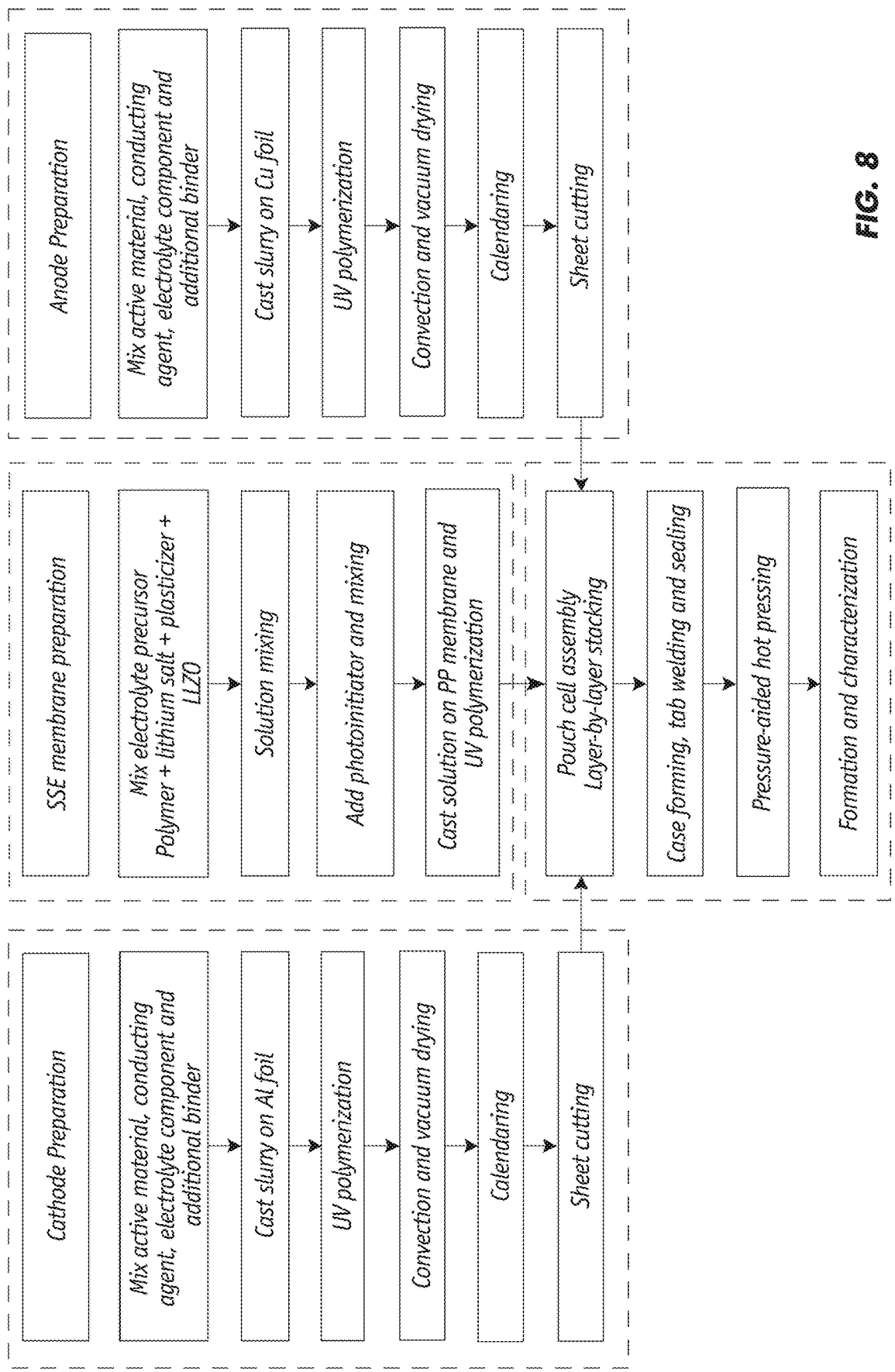
FIG. 8 shows a procedure for making electrochemical pouch cells which incorporates WIP and HPP.

FIG. 8 presents a method of making pouch cells which is can be implemented in four steps: (i) electrolyte preparation, (ii) cathode preparation, (iii) anode preparation and (iv) cell stacking/assembly. To prepare SSE membrane, a precursor solution is prepared by mixing the components and stirring for 1 hour. The solution is coated on a polypropylene (PP) membrane by doctor blade coating, followed by UV crosslinking for 10 minutes.

To prepare cathode sheets, the components are mixed in NMP solvent and stirred overnight. Then, the slurry is coated on an Al foil by doctor blade coating, followed by UV crosslinking for 10 minutes. Thereafter, the sheets are transferred to an oven and dried at 80° C. for 2 hours and then 150° C. under vacuum overnight. Finally, cathode sheets are calendared and cut.

To prepare cathode or anode sheets, the components are mixed in NMP solvent and stirred overnight. Then, the slurry is coated on a Cu foil by doctor blade coating, followed by UV crosslinking for 10 minutes. Thereafter, the sheets are transferred to an oven and dried at 80° C. for 2 hours and then 150° C. under vacuum for overnight. Finally, anode sheets are calendared and cut.

Once the electrolyte, cathode, and anode layers are made, cathode sheets, SSE membrane and anode sheets are stacked layer-by-layer. Then, the cell core is welded and sealed in laminated aluminum case. The pouch cell is into a compression module such as the one shown in FIG. 6A and subjected to HPP. The pouch cell is pressed at 150° C. for 10 minutes.

The effectiveness of hot-pressing was evaluated by characterizing coin cells fabricated without hot-pressing and with hot-pressing procedure. For each cell, the solid-state electrolyte membrane positioned between anode and cathode comprised 12.5 wt % polymer matrix that is derived from PEGDA, 37.5 wt % EC, 33 wt % LiTFSI, 17 wt % $Al_{0.15}Li_{6.85}La_3Zr_{1.75}Ta_{0.25}O_{12}$ with diameters that ranges from 10 to 2000 nm. The cathode comprised 5 wt % carbon black, 80 wt % LFP, 1.67 wt % LiTFSI, 0.82 wt % $Al_{0.15}Li_{6.85}La_3Zr_{1.75}Ta_{0.25}O_{12}$ with diameters that ranged from 10 to 2000 nm, 1.88 wt % EC, 0.63 wt % polymer matrix that is derived from PEGDA and 5% PVDF. The anode was pure lithium metal sheets.

Coin cells which were pressed by HPP were evaluated against standard non-pressed coin cells. Coin cells were stacked with following structures: cathode case, LFP cathode sheet, solid electrolyte, graphite anode sheet, a spacer, a spring and anode case. The coin cell was placed between two dies and pressed at about 1000 psi for 3 min. to yield a standard coil cell. For coin cells with HPP, each coin cell after being stacked was hot pressed by a crimping machine. Typically, the two dies of crimping machine were heating to 100° C. and the temperature maintained for 20 min. to establish stability. Then, the coin cell was placed between the two dies and held for 20 min. to ensure that the entire structure was preheated to 100° C. Finally, a pressure of about 1000 psi was applied and maintained for 3 min. The entire process was conducted in an Ar-filled glovebox.

Figure 9:
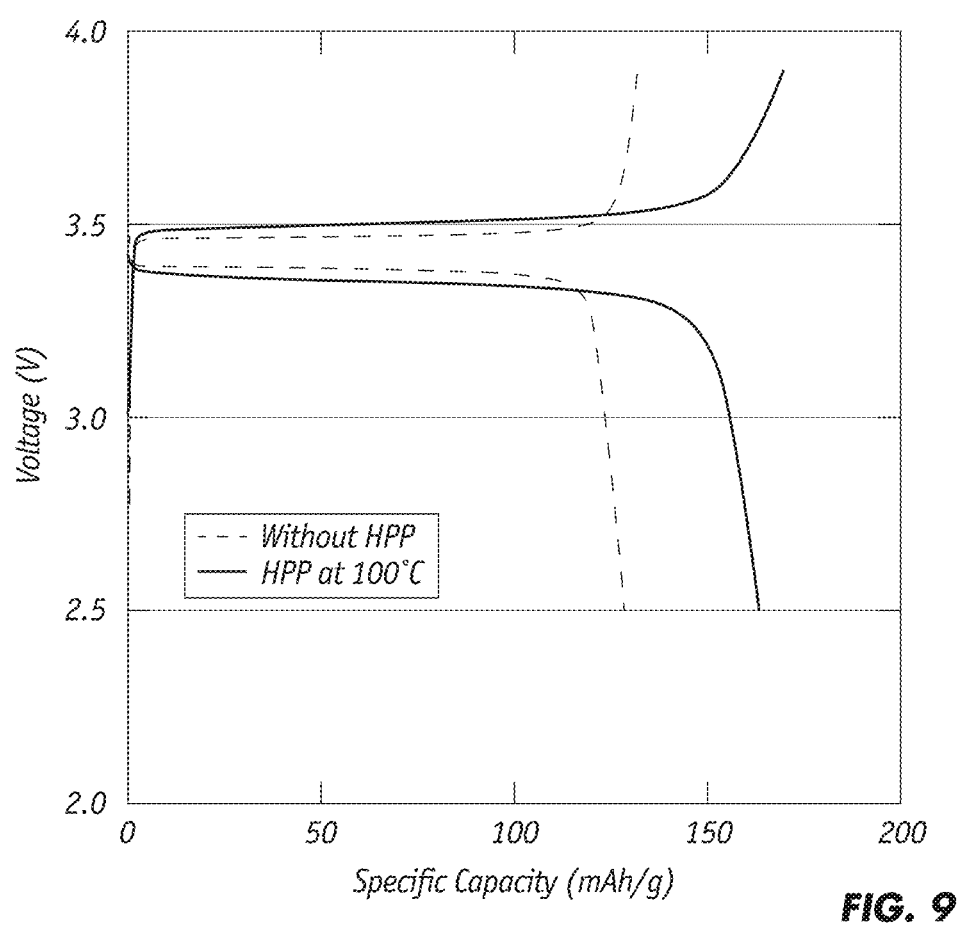
FIG. 9 are charge-discharge profiles for coin cells assembled without and with HPP.
Figure 10A:
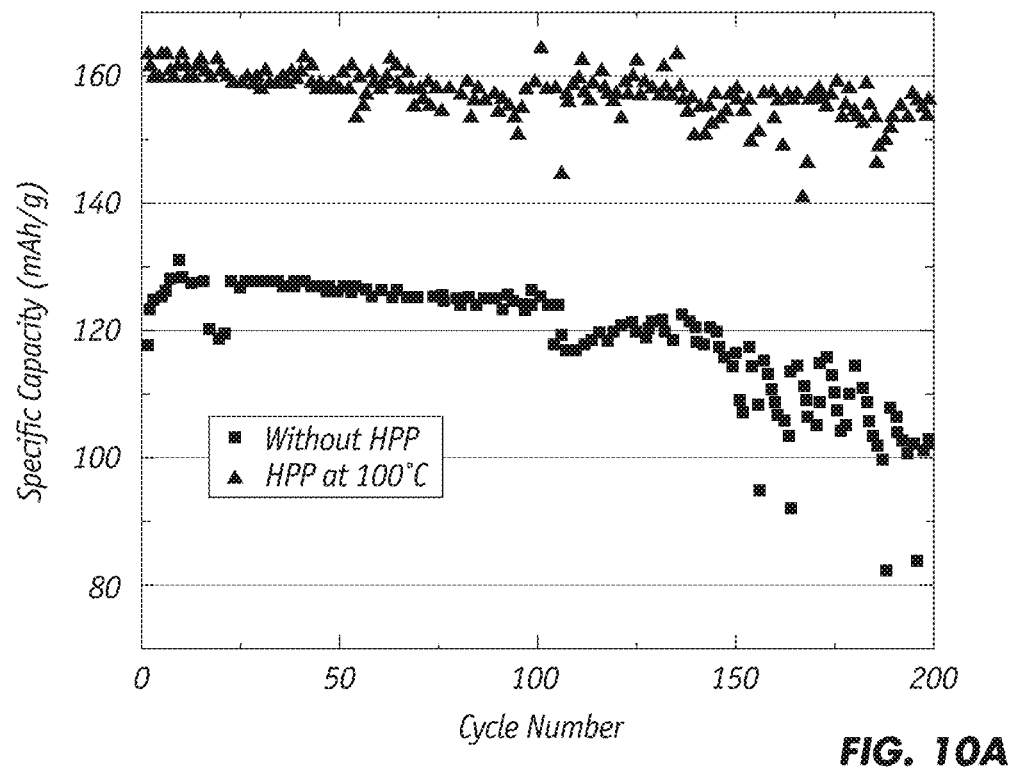
FIGS. 10A and 10B are cycling stability profiles (charged and discharged at 0.5 C) for coin cells assembled without and with HPP.
Figure 10B:
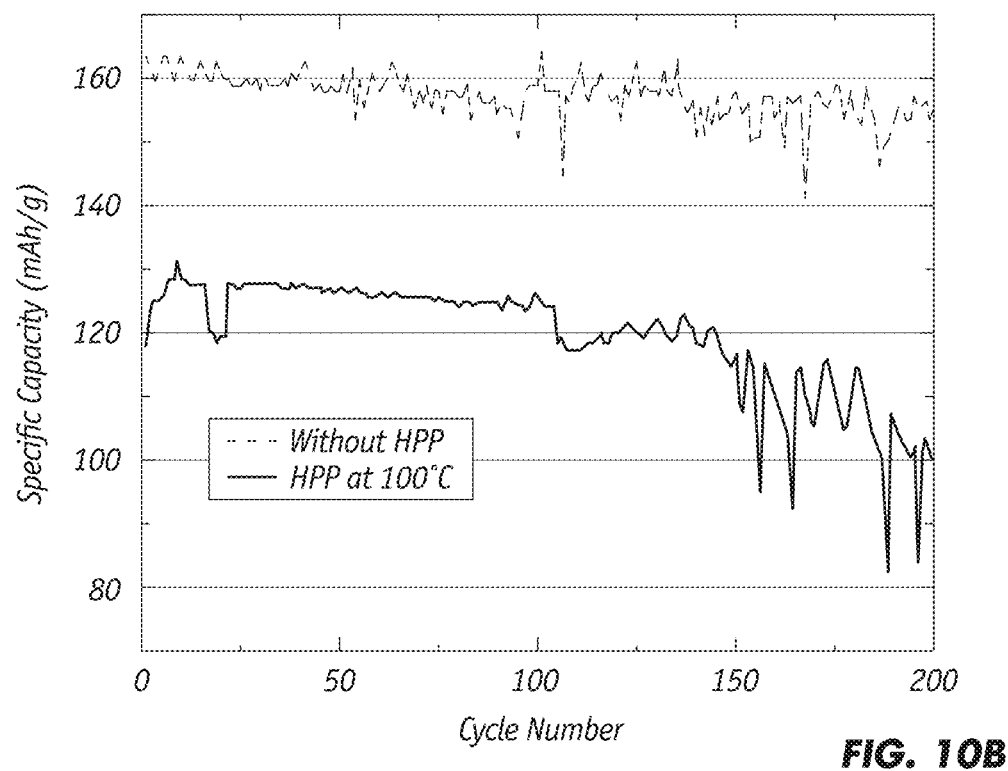

Comparison of rate performance between coin cells made without HPP and with HPP is presented in FIG. 9. When coin cells are charged and discharged at 0.1 C, the specific discharge capacity of cells without HPP and cells with HPP is about 160 mAh/g, and 130 mAh/g respectively. Cycling stability of coin cells made without HPP and with HPP is presented in FIGS. 10A and 10B. The two graphs present the same data but in different formats; the data in FIG. 10B being connected by curves. For coin cells made without the HPP process, when the coin cell was cycled at 0.5 C, the specific discharge capacity remained stable which is close to 125 mAh for the first 130 cycles. After 130 cycles, the specific discharge capacity fluctuated and dropped continuously. When measured at 200 cycles, the specific discharge capacity was about 100 mAh/g and retains 77% of the original value. In contract, when HPP was applied, coin cells exhibited more stable specific capacities as there was no obvious capacity drop at 200 cycles, and the coin cells retained 95% of their original values. Both specific discharge capacity and cycling stability improved with the HPP treatment. Selecting the suitable pressing temperature depends on various factors including solid electrolyte and electrode formulations, the rheology properties of soft polymer-based electrolyte under different temperature temperatures and the solid electrolyte interface that is established between electrolyte and electrode.

Pouch cells processed by HPP and WIP were produced and evaluated by characterizing their rate performance and cycling stability. The pouch cells consisted of 50 unit-cell structures and for each cell, the solid-state electrolyte membrane positioned between anode and cathode comprised 12.5 wt % polymer matrix that is derived from PEGDA, 37.5 wt % EC, 33 wt % LiTFSI, 17 wt % $Al_{0.15}Li_{6.85}La_3Zr_{1.75}Ta_{0.25}O_{12}$ with diameters that ranges from 10 to 2000 nm. The solid-state electrolyte was fabricated by tape casting electrolyte slurry on polypropylene membrane followed by UV crosslinking. The cathode comprised 4 wt % carbon black, 90 wt % LFP, 1.67 wt % LiTFSI, 0.82 wt % $Al_{0.15}Li_{6.85}La_3Zr_{1.75}Ta_{0.25}O_{12}$ with diameters that ranged from 10 to 2000 nm, 1.88 wt % EC, 0.63 wt % polymer matrix that is derived from PEGDA and 4% PVDF. The anode comprised 4 wt % carbon black, 92 wt % graphite, 1.67 wt % LiTFSI, 0.82 wt % $Al_{0.15}Li_{6.85}La_3Zr_{1.75}Ta_{0.25}O_{12}$ with diameters that ranged from 10 to 2000 nm, 1.88 wt % EC, 0.63 wt % polymer matrix that is derived PEGDA and 4 wt % PVDF. The dimensions of the pouch cells were 6.3 cm×4.7 cm×9.3 cm. The pouch cells were assembled generally in accordance with the procedure set forth in FIG. 8. Each pouch cell was pressed by HPP and WIP. First, cathode sheets, SSE membranes and anode sheets were stacked layer-by-layer. The cell core was welded and sealed in laminated aluminum case. Then, the pouch cell was sealed in a waterproof bag under vacuum. In the meantime, the chamber of WIP machine was pre-heated to 95° C., and the bag was transferred into the chamber and kept for 10 min. and hydraulic pressure of about 20000 psi was applied for 10 min. The pouch cell was then placed into a compression module and HPP and heated to 150° C. Then, a pressure of 400 psi was applied for 10 mins.

Figure 11:
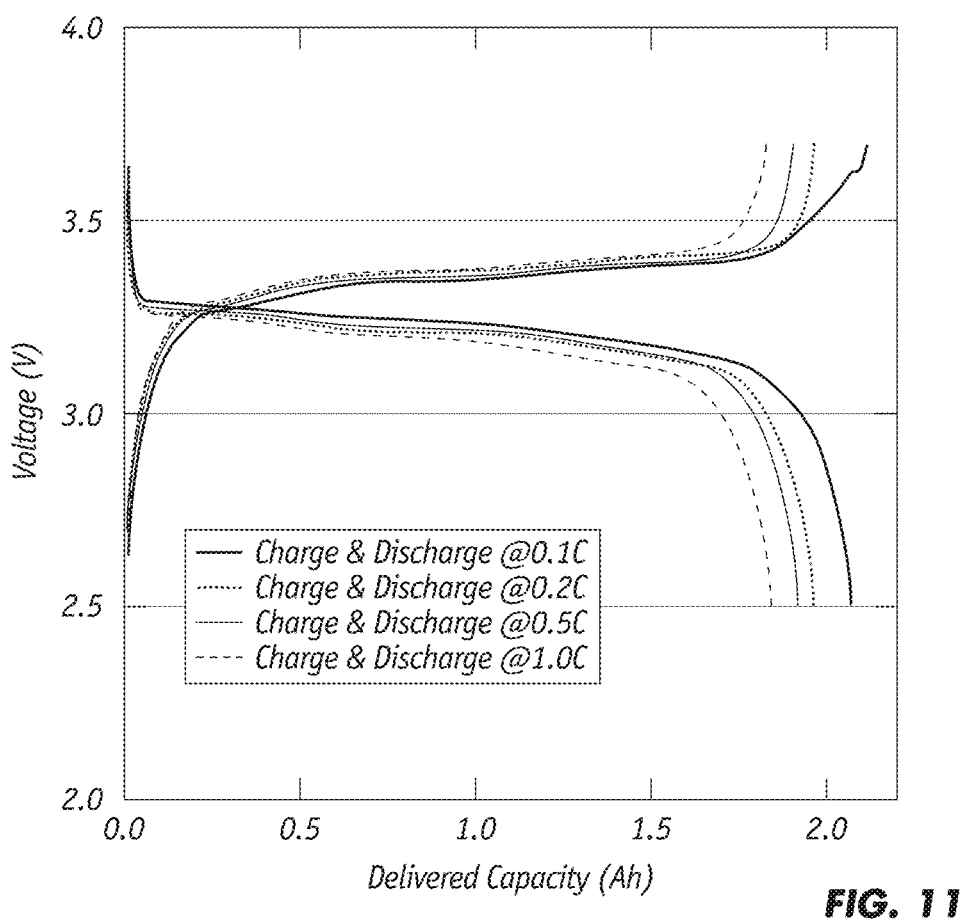
FIG. 11 is charge-discharge profile of pouch cells made using WIP and HPP.
Figure 12:
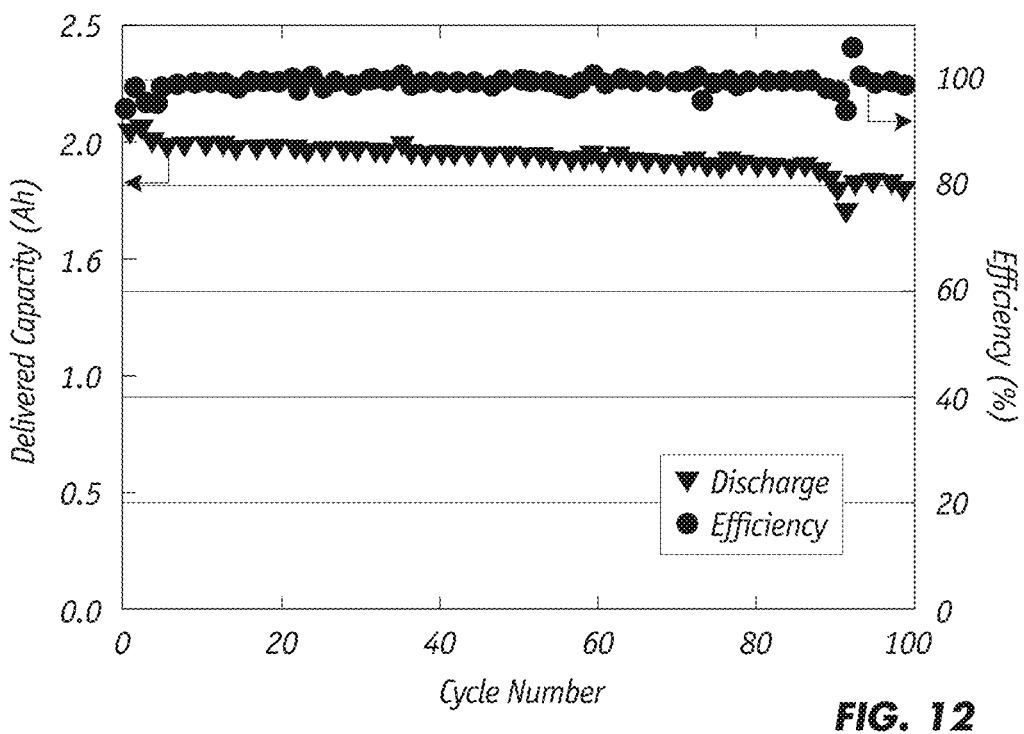
FIG. 12 is cycling stability profile of pouch cells made using WIP and HPP.

The optimized mass energy density and volume energy density of the all solid-state pouch cell prototype could reach over 200 Wh/kg and 350 Wh/L. FIG. 11 shows rate performance of pouch cell consisting of 50 unit-cell in parallel connection. The standard capacity of this prototype was about 2 Ah. When pouch cell was charged and discharged at 0.1 C, 0.2 C, 0.5 C and 1.0 C, the delivered capacity was around 2.06 Ah, 1.99 Ah, 1.93 Ah and 1.92 Ah, respectively, indicating good and stable rate performance. FIG. 12 shows cycling stability of pouch cell which was charged and discharged at 0.2 C. During test, the delivered capacity drops continuously but maintained a stable value between 1.9 Ah and 1.8 Ah. After over 100 cycles, the delivered capacity still retained 90% of the original value.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of fabricating a solid-state lithium-ion battery comprising:
   (a) providing an anode layer;
   (b) providing a cathode layer;
   (c) positioning a ceramic-polymer composite electrolyte membrane between the anode layer and the cathode layer to form a laminar battery assembly;
   (d) applying pressure to the laminar battery assembly by applying a pressure of 100 to 80,000 psi to the pouch for 1 to 100 min; and
   (e) heating the laminar battery assembly.

2. A method of fabricating a solid-state lithium-ion battery comprising:
   (a) providing an anode layer;
   (b) providing a cathode layer;
   (c) positioning a ceramic-polymer composite electrolyte membrane between the anode layer and the cathode layer to form a laminar battery assembly;
   (d) applying pressure to the laminar battery assembly; and
   (e) heating the laminar battery assembly by heating the pouch to a temperature of 80 to 280° C. for 1 to 100 min.

3. The method of claim 1 wherein the laminar battery assembly is encased in metal casing comprising a positive contact surface and a negative contact surface wherein the positive contact surface is substantially co-extensive and extends parallel to the negative contact surface.

4. A method of fabricating a solid-state lithium-ion battery comprising:
   (a) providing an anode layer;
   (b) providing a cathode layer;
   (c) positioning a ceramic-polymer composite electrolyte membrane between the anode layer and the cathode layer to form a laminar battery assembly which is encased in metal casing comprising a positive contact surface and a negative contact surface wherein the positive contact surface is substantially co-extensive and extends parallel to the negative contact surface;
   (d) applying pressure to the laminar battery assembly by applying a pressure of 100 to 80,000 psi to the metal casing for 1 to 100 min; and
   (e) heating the laminar battery assembly.

5. A method of fabricating a solid-state lithium-ion battery comprising:
   (a) providing an anode layer;
   (b) providing a cathode layer;
   (c) positioning a ceramic-polymer composite electrolyte membrane between the anode layer and the cathode layer to form a laminar battery assembly which is encased in metal casing comprising a positive contact surface and a negative contact surface wherein the positive contact surface is substantially co-extensive and extends parallel to the negative contact surface;
   (d) applying pressure to the laminar battery assembly; and
   (e) heating the laminar battery assembly by heating the metal casing to a temperature of 80 to 280° C. for 1 to 100 min.

6. The method of claim 1 wherein step (d) comprises using a flat press.

7. A method of fabricating a solid-state lithium-ion battery comprising:

(a) providing an anode layer;
(b) providing a cathode layer;
(c) positioning a ceramic-polymer composite electrolyte membrane between the anode layer and the cathode layer to form a laminar battery assembly;
(d) applying pressure to the laminar battery assembly by using a pressurized liquid-filled chamber; and
(e) heating the laminar battery assembly.

8. A method of fabricating a coin cell that comprises:
(a) providing a first metal pole having a first planar exterior surface;
(b) providing a second metal pole having a second planar exterior surface;
(c) positioning a unit cell between the first and second metal poles wherein the unit cell comprises (i) an anode layer (ii) cathode layer and (iii) a ceramic-polymer composite electrolyte membrane between the anode layer and the cathode layer;
(d) applying pressure to compress the first and second metal poles, wherein the first and second poles are electronically separated by an insulating material; and
(e) heating the first and second metal poles.

9. The method of claim 8 wherein the ceramic-polymer composite electrolyte membrane comprises: (i) a polymer matrix, (ii) ceramic nanoparticles with diameters that range from 10 to 2000 nm that are distributed in the polymer matrix, (iii) a plasticizer and (iv) a lithium salt, wherein the ceramic nanoparticles are selected from the group consisting of ceramic materials which has the basic formula $Li_7La_3Zr_2O_{12}$ (LLZO) and derivatives thereof wherein at least one of Al, Ta or Nb is substituted in Zr sites of the $Li_7La_3Zr_2O_{12}$.

10. A solid-state lithium-ion battery that is fabricated by:
(a) providing an anode layer;
(b) providing a cathode layer;
(c) positioning a ceramic-polymer composite electrolyte membrane between the anode layer and the cathode layer to form a laminar battery assembly wherein the ceramic-polymer composite electrolyte membrane comprises: (i) a polymer matrix, (ii) ceramic nanoparticles with diameters that range from 10 to 2000 nm that are distributed in the polymer matrix, (iii) a plasticizer and (iv) a lithium salt, wherein the ceramic nanoparticles are selected from the group consisting of ceramic materials which has the basic formula $Li_7La_3Zr_2O_{12}$ (LLZO) and derivatives thereof wherein at least one of Al, Ta or Nb is substituted in Zr sites of the $Li_7La_3Zr_2O_{12}$;
(d) applying pressure to the laminar battery assembly; and
(e) heating the laminar battery assembly.

11. The battery of claim 10 wherein the laminar battery assembly is sealed in a flexible shell in the form of a pouch.

12. A solid-state lithium-ion battery that is fabricated by:
(a) providing an anode layer;
(b) providing a cathode layer;
(c) positioning a ceramic-polymer composite electrolyte membrane between the anode layer and the cathode layer to form a laminar battery assembly;
(d) applying pressure to the laminar battery assembly; and
(e) heating the laminar battery assembly, wherein the laminar battery assembly is in the form of a coin cell.

* * * * *

UNITED STATES PATENT AND TRADEMARK OFFICE
CERTIFICATE OF CORRECTION

| | | |
|---|---|---|
| PATENT NO. | : 11,631,890 B2 | Page 1 of 1 |
| APPLICATION NO. | : 17/313992 | |
| DATED | : April 18, 2023 | |
| INVENTOR(S) | : Zhigang Lin et al. | |

It is certified that error appears in the above-identified patent and that said Letters Patent is hereby corrected as shown below:

In the Specification

In Column 1, Line 4 before the "FIELD OF THE INVENTION" heading and after the title, insert:
-- STATEMENT REGARDING FEDERALLY SPONSORED RESEARCH OR DEVELOPMENT
This invention was made with government support under SBIR Grant No. N6833518C0685 awarded by the United States Navy. The government has certain rights in the invention. --.

Signed and Sealed this
Sixteenth Day of July, 2024

Katherine Kelly Vidal
*Director of the United States Patent and Trademark Office*